United States Patent [19]

Igarashi et al.

[11] Patent Number: 5,696,321
[45] Date of Patent: Dec. 9, 1997

[54] THERMAL-TYPE AIR FLOW MEASURING INSTRUMENT WITH FLUID-DIRECTION JUDGING CAPABILITY

[75] Inventors: Shinya Igarashi; Chihiro Kobayashi, both of Ibaraki-ken; Yasunori Mouri; Hitoshi Ishikawa, both of Hitachinaka; Kaoru Uchiyama, Ibaraki-ken, all of Japan

[73] Assignees: Hitachi, Ltd.; Hitachi Car Engineering Co., Ltd., both of Japan

[21] Appl. No.: 544,648

[22] Filed: Oct. 18, 1995

[30] Foreign Application Priority Data

Oct. 18, 1994 [JP] Japan ................................ 6-251801

[51] Int. Cl.$^6$ ................................ G01F 1/68; G01M 15/00
[52] U.S. Cl. ................................ 73/202.5; 73/118.2
[58] Field of Search ................................ 73/202, 202.5, 73/118.2

[56] References Cited

U.S. PATENT DOCUMENTS

| | | | |
|---|---|---|---|
| 4,478,075 | 10/1984 | Oyama et al. | 73/118.2 |
| 4,974,445 | 12/1990 | Arai et al. | 73/118.2 |
| 5,355,726 | 10/1994 | Zurek et al. | 73/202.5 |
| 5,467,648 | 11/1995 | Igarashi et al. | 73/202 |

FOREIGN PATENT DOCUMENTS

| | | |
|---|---|---|
| 0 450 563 A1 | 10/1991 | European Pat. Off. . |
| 0 588 626 A2 | 3/1994 | European Pat. Off. . |
| 62-812 | 1/1987 | Japan . |

Primary Examiner—George M. Dombroske
Assistant Examiner—Harshad Patel
Attorney, Agent, or Firm—Evenson, McKeown, Edwards & McKeown, P.L.L.C.

[57] ABSTRACT

There is disclosed a thermal-type air flow measuring instrument which judges whether the direction of flow of a fluid, ranging from a static flow to a pulsating flow involving a reverse flow, is forward or reverse, and outputs a signal corresponding to the flow rate of the fluid, thereby measuring the flow rate with high precision. An auxiliary passage is provided in a fluid passage, and is constituted by first, second and third passageways. Two temperature sensing resistors are mounted respectively at an upstream side and a downstream side within the first passageway in close proximity to each other. Most of the fluid, flowed into the first passageway in a forward direction, flows through the second passageway. The third passageway serves to direct a reverse flow of the fluid toward the temperature sensing resistors. Results of measurement of the flow rate of intake air in an internal combustion engine indicate that a minus error due to a pulsating flow, experienced in the conventional construction, is eliminated almost completely, and that a plus error due to a reverse flow is reduced to about $\frac{1}{10}$.

23 Claims, 8 Drawing Sheets

PRESENT INVENTION

THERMAL-TYPE AIR FLOW MEASURING INSTRUMENT WITH FLUID-DIRECTION JUDGING CAPABILITY

BACKGROUND OF THE INVENTION

This invention relates to a thermal-type air flow measuring instrument which judges the direction of flow of a fluid in a fluid passage when the fluid flow is changed from a forward direction to a reverse direction and vice versa, and outputs a signal corresponding to the flow rate of the fluid, and more particularly to a thermal-type air flow measuring instrument suited for measuring the rate of flow of intake air in an internal combustion engine.

One example of a conventional instrument is a hot wire-type air flowmeter disclosed in Japanese Patent Unexamined Publication No. 62-812. This prior publication specifically describes a construction of a temperature sensing resistor for detecting a forward flow and a reverse flow, a construction of a circuit for judging a flow direction and a flow rate, and a mechanism for detecting the flow direction and the flow rate. With respect to a passage construction, this prior publication describes only an arrangement in which a detection element is provided in a fluid passage without the provision of an auxiliary passage, and an arrangement in which a detection element is provided in a simple, round conduit-like auxiliary passage in a fluid passage.

In order to precisely detect the flow rate over an entire range from a steady flow to a pulsating flow involving a reverse flow, it is necessary to detect the flow rate obtained by subtracting the reverse flow rate from the forward flow rate so as to reduce a plus error in the output of the flow measuring instrument when a reverse flow develops. The technique disclosed in Japanese Patent Unexamined Publication No. 62-812 enables the outputting of the flow signal representative of both the forward flow and the reverse flow, and the reduction of such a plus error has already been taken into consideration.

In the above conventional technique, however, when the fluid to be measured pulsates, the output signal contains a minus error. This is due to a non-linear nature of radiating characteristics of the heating resistor and a response delay. Since this is caused as a result of pulsating of the forward flow, this problem could not be overcome by measuring the reverse flow rate.

SUMMARY OF THE INVENTION

It is therefore an object of this invention to provide a thermal-type air flow measuring instrument capable of correctly measuring the rate of flow of a fluid including forward and reverse flows, such as a pulsating flow involving a reverse flow.

In the present invention, temperature sensing resistors for detecting the flow rate are provided within an auxiliary passage provided within a fluid passage (main passage), and in order that when a pulsating flow develops, a forward flow of a fluid introduced into the auxiliary passage can have a higher inertia effect than the flow in the main passage, the length of the auxiliary passage along the forward flow through the auxiliary passage is larger than the length of the auxiliary passage along the forward flow through the main passage, thereby canceling a minus error. In order that the rate of a reverse flow can also be measured, a passageway for directing the reverse flow toward the temperature sensing resistors is provided in the auxiliary passage.

Further, with respect to the stream varying from a steady flow to a pulsating flow and a reverse flow, its flow velocity profile must be taken into consideration. In the steady flow, various kinds of different drifts are caused by the configuration of that portion disposed upstream of the fluid passage. For example, if there is provided a long straight conduit upstream of the fluid passage, the flow velocity is high at the center line of the fluid passage, and is low at a peripheral portion of the fluid passage, thus producing a parabolic flow velocity profile. Instead, if there is a bent conduit upstream of the fluid passage, the flow velocity is high at an outer portion of the bent portion, and is low at an inner portion of the bent portion. In case of a pulsating flow, an almost flat flow velocity profile is liable to develop, and in the case of a pulsating flow involving a reverse flow, it is quite possible that a drift is caused by a change in flow velocity profile. Therefore, it is necessary to measure the flow in the main passage as averagely as possible, and in a thermal-type air flow measuring instrument which measures a very small portion of a flow and estimates the total flow rate from it, a measurement error due to the flow velocity profile poses a problem. In the present invention, the temperature sensing resistors are provided within the auxiliary passage, and an inlet portion of the auxiliary passage is formed into a dish-like configuration so that the fluid flow can be introduced over a wide range. Further, in order that the difference of the flow velocity at a position upstream of the outlet of the auxiliary passage from its average flow velocity can cancel the difference of the flow velocity at a position upstream of the inlet of the auxiliary passage from its average flow velocity, this outlet is opened in a plane substantially parallel to the direction of the main flow, and either a projection for deflecting the flow is provided upstream or downstream of this outlet, or such projections are provided upstream and downstream of the outlet, respectively.

Although there is already known a thermal-type air flow measuring instrument which judges whether the direction of flow is forward or reverse, and measures the flow rate, there has not been disclosed a technique by which a minus measurement error due to a pulsating flow can be avoided while maintaining effects achieved by the known measuring instrument. The present invention provides a solution to it.

The relation between the flow rate and the output in the thermal-type air flow measuring instrument is dominated by the radiation of heat (that is, physical phenomenon) from the heating element to the fluid, and exhibits non-linear characteristics. Therefore, when a pulsating flow is to be measured, the measured (estimated) value is smaller than the actual value, and more specifically contains a minus error because of the radiation characteristics and a delay in the detection by a control circuit. Therefore, in order to cancel the minus error due to the pulsating flow, there is used the auxiliary passage construction capable of compensating for the error by the pulsating flow. The temperature sensing resistors for detecting the flow rate are to be provided within the auxiliary passage, and the length of the auxiliary passage along the flow through the auxiliary passage is to be larger than the length of the auxiliary passage along the flow through the main passage, thereby the pulsating flow in the auxiliary passage having a greater inertia than the pulsating flow developing in the main passage. Therefore, the average flow velocity of the pulsating flow in the auxiliary passage is increased, so that a plus error can develop in the measured value, thereby canceling the minus error. However, the conventional auxiliary passage can not sufficiently lead or direct a reverse flow to the temperature sensing resistors. Therefore, in the present invention, the auxiliary passage is constituted by a combination of three passageways, that is, a first passageway in which the temperature sensing resistors are provided, a second passageway designed to increase the overall length of the auxiliary passage along the forward flow in the auxiliary passage (through which second passageway most of the forward flow passes in the forward direction), and a third passageway for allowing a reverse flow to be directed toward the temperature sensing resistors.

For example, the first passageway, having the temperature sensing resistors mounted therein, is arranged substantially parallel to the direction of the main flow, and the second passageway intersects substantially perpendicular to the first passageways, and extends generally perpendicular to the main flow, so that the first and second passageways cooperate with each other to form the auxiliary passage of a substantially L-shaped cross-section. With this construction, there is provided the auxiliary passage which has a long fluid passageway, and can achieve a greater inertia effect. If the third passageway is provided immediately downstream of the temperature sensing resistors in parallel relation to the main flow, and is directed toward these resistors, a reverse flow can be directed to the temperature sensing resistors. Here, the third passageway need to be smaller in transverse cross-sectional area (flow area) than the second passageway so that most of the fluid, introduced into the auxiliary passage in the forward direction, can flow through the second passageway. The smaller the cross-sectional area of the third passageway is, the more easily the forward-flow fluid can flow through the second passageway, thereby reducing the above minus error. However, if this cross-sectional area is too small, the amount of introduction of the reverse flow into the auxiliary passage becomes unduly small. This adversely affects the detection of the direction of the flow, as well as the detection of the reverse flow rate. Therefore, if the inner diameter of the third passageway is made generally equal to a sensing portion of the temperature sensing resistor, the overall detecting precision can be enhanced. Furthermore, if the third passageway is flaring in the direction of the forward flow, the resistance to the forward flow is increased, so that the reverse flow can be easily introduced into the auxiliary passage. If the third passageway is projected into the auxiliary passage toward the temperature sensing resistors, the distance between the third passageway and the temperature sensing resistors can be reduced while keeping the area of a corner portion, interconnecting the first and second passageways, sufficiently large. Therefore, the reverse flow is blown out of the third passageway in a less diffused manner, and hence is efficiently applied to the temperature sensing resistors. This makes the auxiliary passage of the invention more effective.

The inlet portion of the auxiliary passage can be formed into a dish-like configuration to increase a pressure-receiving portion for receiving the flow. In this case, a wide range of the flow is introduced into the auxiliary passage through this dish-like inlet portion, so that the average flow velocity can be detected. Therefore, a change in flow velocity profile can be dealt with. If a bottom surface of the dish-like inlet portion is inclined, the efficiency of introducing a wide range of the flow is further enhanced. Furthermore, if the outlet of the second passageway is opened in a plane parallel to the direction of the main flow, and a projection is provided adjacent to this outlet portion, a negative pressure at the outlet varies in accordance with the flow velocity at a position upstream the outlet, and therefore the rate of flow of the fluid into the auxiliary passage can be averaged by the flow velocity at a position upstream of the inlet and the flow velocity at a position upstream of the outlet of the auxiliary passage.

If the auxiliary passage is formed integrally with the main passage (fluid passage), the number of the component parts can be reduced. If the auxiliary passage-constituting member is a separate member, and is connected to a circuit part into an integrated module, this module can be easily handled as when it is exchanged, and also such a module can be attached to an existing fluid passage, in which case there is no need to provide a main passage for the flow measuring instrument.

DESCRIPTION OF THE PREFERRED EMBODIMENTS

Figure 1:
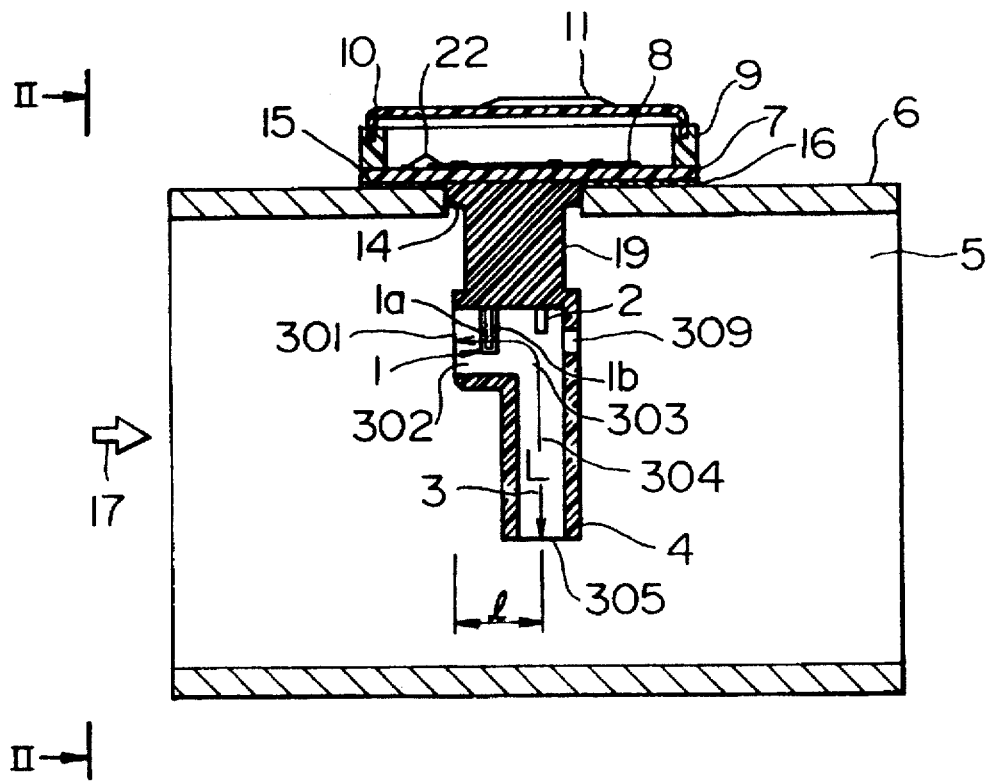
FIG. 1 is a longitudinal cross-sectional view of one preferred embodiment of a thermal-type air flow measuring instrument of the present invention.
Figure 2:
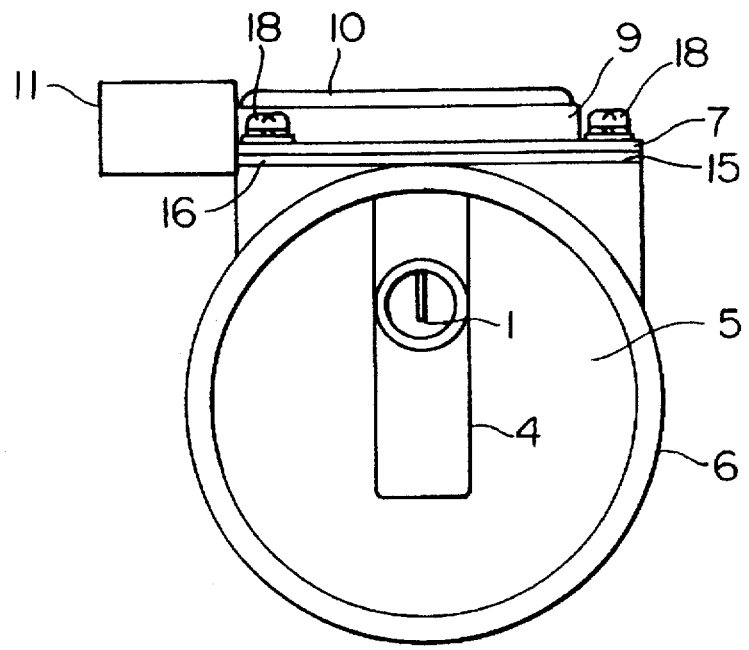
FIG. 2 is a side-elevational view as seen along the line II—II of FIG. 1.

FIGS. 1 and 2 show one preferred embodiment of a thermal-type air flow measuring instrument of the present invention. In this instrument, a heating resistor 1 for detecting the rate of flow and the direction of flow and a temperature compensation resistor 2 are fixedly mounted on a holder 19, and are electrically connected to an electronic circuit 8. The heating resistor 1 comprises two temperature sensing resistors 1a and 1b mounted on a plate-like base surface, and are disposed at an upstream side and a downstream side, respectively. An auxiliary passage 3 comprises an L-shaped flow passage which is constituted by an inlet port or opening 301 opened in a plane perpendicular to a plate-like base member 7, a first passageway 302 extending from the inlet port 301 in parallel relation to the base member 7, a second passageway 304 (which is about twice larger in length than the first passageway 302) extending perpendicular to the base member 7 in communication with the first passageway 302, an outlet port or opening 305 opened in a plane parallel to the base member 7, and a right-angular corner portion 303 disposed at the intersection between the first and second passageways 302 and 304. The auxiliary passage further has a third passageway 309 provided immediately downstream of sensing portions of the temperature sensing resistors of the heating resistor 1 in substantially parallel relation to the first passageway 302. An auxiliary passage-constituting member 4 is fixedly mounted on the base member 7 in such a manner that the heating resistor 1 is disposed within the first passageway 302 and that the resistor 2 is disposed within the right-angular corner portion 303.

The electronic circuit 8 and a circuit housing 9 are fixedly mounted on an upper surface of the base member 7, and a connector 11 for connection to an external equipment is formed integrally with the circuit housing 9. The upper side of the circuit housing 9 is covered by a cover 10.

A flowmeter body 6 defining a main passage (fluid passage) 5 is provided at a peripheral wall thereof with an insertion hole 14 through which the auxiliary passage-constituting member 4 is inserted into the body 6, and with a mounting or fixing surface 15 on which the base member 7 is mounted. The auxiliary passage-constituting member 4 is inserted into the flowmeter body 6 through the insertion hole 14 in such a manner that the first passageway 302 of the auxiliary passage 3 is parallel to a direction 17 of flow in the main passage 5. A rubber packing 16 is interposed between the mounting surface 15 and the base member 7 to seal a region around the insertion hole 14, and the base member 7 is fastened to the peripheral wall of the body 6 by screws (18 FIG. 2).

Figure 1A:
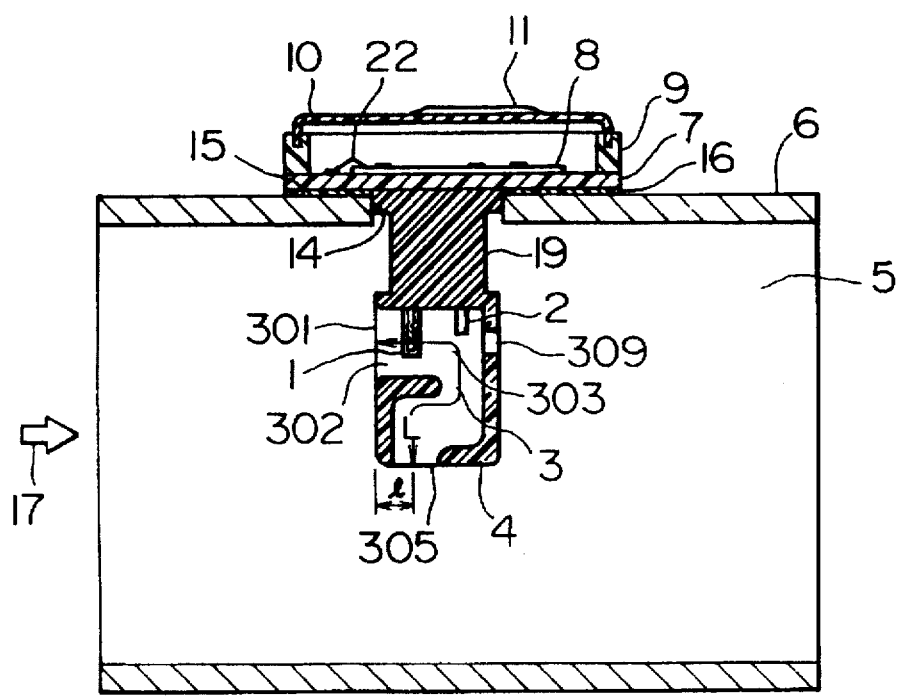
FIG. 1A is a view similar to FIG. 1, but showing a modified form of the instrument of FIG. 1.

The auxiliary passage 3, receiving the temperature sensing resistors therein, need only to be so arranged that an overall length L of the flow passage (through which the fluid flows) in the auxiliary passage 3 is longer than a length between the inlet port 301 and the outlet port 305 along the flow in the main passage 5. Therefore, the L-shaped auxiliary passage 3 may be replaced by an S-shaped passage as shown in FIG. 1A.

Another preferred embodiment of the invention will now be described with reference to FIGS. 3 to 5A, in which there is provided a construction for enhancing the precision, and an auxiliary passage-constituting member and a base member are fastened together in a manner different from the above manner.

Terminals 13 extend through a holder 19, and are connected integrally to this holder 19. The holder 19 extends through a hole formed through a base member 7, and is fixedly connected to the base member 7. An electronic circuit 8 is fixedly mounted on an upper surface of the base member 7 or an upper surface of the holder 19. The terminals 13 are electrically connected to the electronic circuit 8 through electrically-conductive members 22 such as wires. A circuit housing 9 is mounted on the upper surface of the base member 7, and the upper side of the circuit housing 9 is covered by a cover 10 fixedly connected thereto.

Temperature sensing resistors 1a and 1b are electrically connected to one end portions of the associated terminals 13 remote from the electronic circuit 8, and are in align with each other in a direction of flow. Within a first passageway 302 of an auxiliary passage 3, the temperature sensing resistors 1a and 1b are fixedly disposed closer to the base member 7 than resistors 2 are, and are in align with each other in the direction of flow in close to each other.

Figure 5:
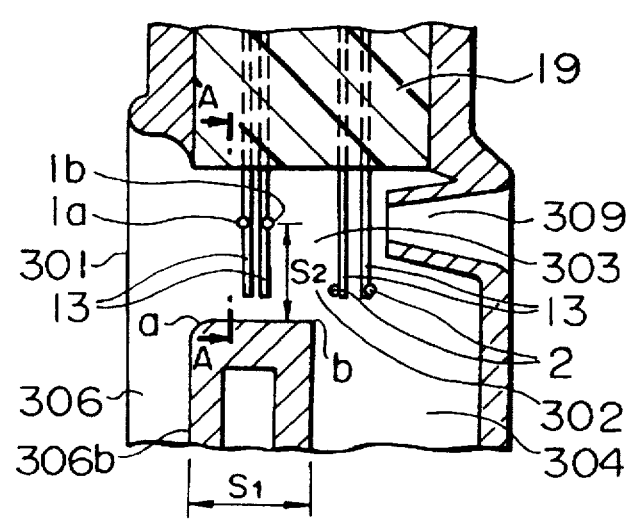
FIG. 5 is an enlarged, fragmentary cross-sectional view of a heating resistor shown in FIG. 3.
Figure 5A:
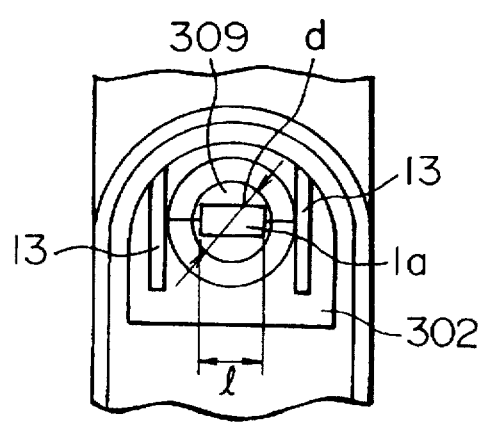
FIG. 5A is an enlarged, fragmentary cross-sectional view taken along the line A—A of FIG. 5.

As in the above first embodiment, the auxiliary passage-constituting member 4 has an L-shaped flow passage which is constituted by an inlet port 301, the first passageway 302, a right-angular corner portion 303, a second passageway 304 and an outlet port 305. The auxiliary passage-constituting member 4 further has a third passageway 309 which projects toward a heating resistor, and is flaring in the direction of the forward flow. The inner diameter of the smallest-diameter portion of the third passageway 309 is generally equal to a length l of the sensing portion of the temperature sensing resistors 1a and 1b. The auxiliary passage constituting member 4 further includes an inlet portion 306 having a peripheral wall 310, an inclined surface 307 having opposite side walls 311, a projection 308 extending from a distal end of this inclined surface 307 downwardly beyond the outlet port 305, a hole 401 through which the holder 19 passes, and a bonding surface 402 adapted to be fitted to the holder 19. The inlet portion 306 serves to introduce the fluid into the auxiliary passage 3 mainly from a radially-central portion of a main passage 5. The inclined surface 307 with the opposite side walls 311 and the projection 308 serve to stabilize the flow at an outlet portion of the auxiliary passage 3. The temperature sensing resistors 1a and 1b, fixedly provided within the first passageway 302, are disposed closer to the base member 7. The third passageway 309 is disposed in align with the temperature sensing resistors 1a and 1b, and is offset toward an outer corner of the right-angular corner portion 303, so that the forward flow is less liable to enter the third passage. However, the temperature sensing resistors 1a and 1b do not always need to be disposed in align with the third passageway 309. In order that the stable flow whose velocity is relatively high in a plane (or cross-sectional area) perpendicular to the flow in the first passageway 302) can impinge on the temperature sensing resistors 1a and 1b, the first passageway 302 has a cross-sectional shape formed by a combination of a semi-circular shape and a rectangular shape, as shown in FIG. 5A. Here, the distance between a corner a, defined by a bottom or base surface 306b of the inlet portion 306 and the inner surface of the first passage 302, and an inner corner b of the right-angular corner portion 303 is represented by $S_1$, and the distance between the inner surface of the first passageway 302, interconnecting the two corners a and b, and the temperature sensing resistors 1a and 1b is represented by $S_2$. The relation between the two distances is so determined that $S_2/S_1=0.5/1.0$ is established. A lightening hole 403 is formed in the auxiliary passage-constituting member 4 in parallel relation to the second passageway 304, so that the walls of the auxiliary passage-constituting member 4 have a generally uniform thickness, thereby preventing deformation of the shape due to a plastic molding sink. This also contributes to the reduction of the material cost and the weight. The holder 19 is inserted into the holder insertion hole 401, and the holder 19 is adhesively bonded or fixed to the bonding surface 402 of the auxiliary passage-constituting member 4. A groove 404 is formed by a step portion on the holder 19 and the bonding surface 402 of the auxiliary passage-constituting member 4. An O-ring 20 is mounted in this groove 404, and seals an insertion hole 14 formed in the peripheral wall of the main passage 5. With this construction, there is provided a module in which the circuit portion, the auxiliary passage portion and the insertion hole-sealing O-ring are integrally combined together.

This module is fixedly mounted on a flowmeter body 6, thus completing the thermal-type air flow measuring instrument. In this embodiment, since the insertion hole-sealing O-ring 20 is provided on the module, the use of a rubber packing is not necessary. In this embodiment, the circuit housing 9, together with the base member 7, is fixedly secured to the body 6 by screws 18, thereby increasing the strength of fastening of the circuit housing 9. A flow-rectifying grating 21 is attached to the inlet of the main passage 5 to further enhance the precision of the measurement.

Figure 6:
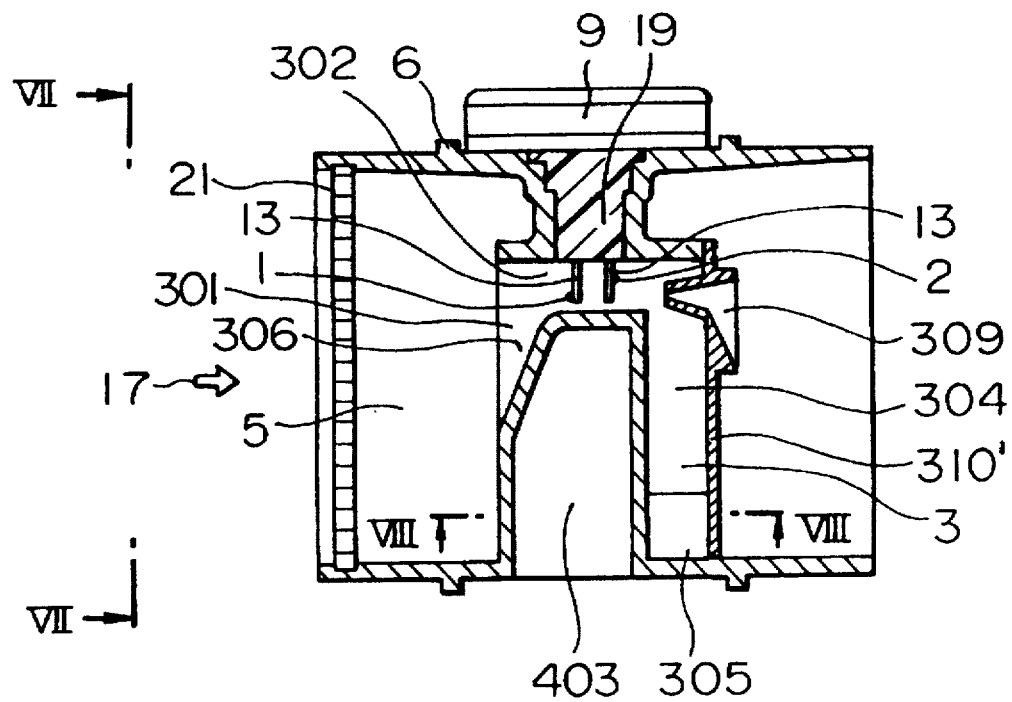
FIG. 6 is a longitudinal cross-sectional view of a further embodiment of a thermal-type air flow measuring instrument of the invention.
Figure 7:
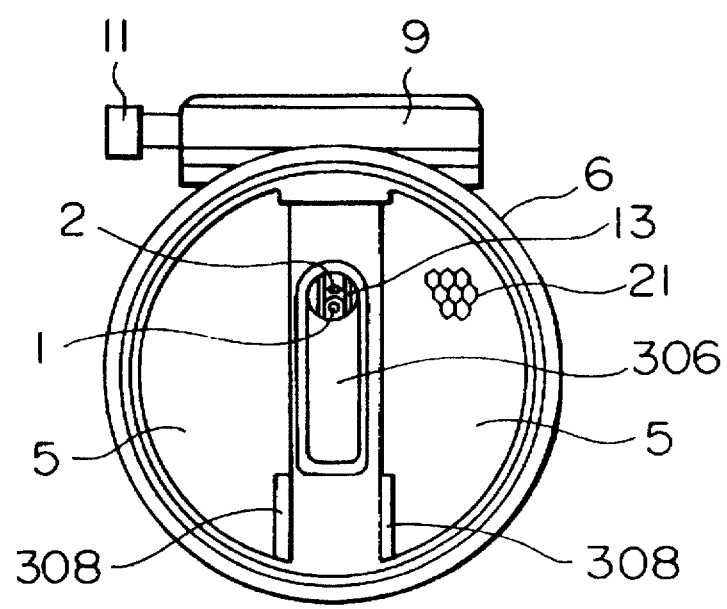
FIG. 7 is a side-elevational view as seen along the line VII—VII of FIG. 6.
Figure 8:
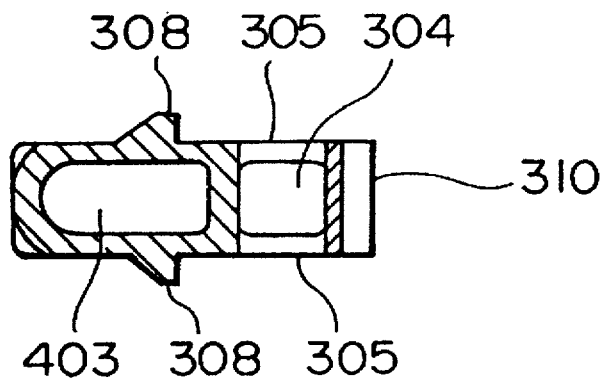
FIG. 8 is a cross-sectional view taken along the line VIII—VIII of FIG. 6.

FIGS. 6 to 8 shows a further preferred embodiment of the invention in which an auxiliary passage 3, together with a main passage 5, is formed integrally with a flowmeter body 6. As in the above embodiments, the auxiliary passage 3 comprises an L-shaped passage having a first passageway 302 and a second passageway 304, and a third passageway 309 for introducing a reverse flow. In the auxiliary passage 3 formed integrally with the flowmeter body 6, a groove, formed in an auxiliary passage-constituting portion, is closed by a back plate 310' to form the second passageway 304. Therefore, the third passageway 309 is formed in the back plate 310', and a pair of outlet ports 305 are formed respectively at opposite sides of a distal end portion of the second passageway 304. A pair of projections 308 for deflecting and separating the flow are formed on the auxiliary passage-constituting portion, and are disposed upstream of the two outlet ports 305, respectively. An inlet port portion 301 in the first passageway 302 is formed into a generally dish-like configuration having an inclined bottom or base surface. Similarly, a port or opening in the third passageway is formed into a generally dish-like configuration having a bottom surface. A heating resistor 1 comprises film-like temperature sensing resistors provided respectively on an upstream side surface and a downstream side surface of a cylindrical bobbin, and can detect an forward flow and a reverse flow. The heating resistor 1 is fixedly connected to terminals 13, and is electrically connected to an electronic circuit 8. A holder 19 is inserted into an insertion hole in the flowmeter body 6 in such a manner that the heating resistor is disposed within the auxiliary passage 3, and a circuit housing 9 is fixedly mounted on the flowmeter body 6, thereby completing a thermal-type air flow measuring instrument.

Figure 3:
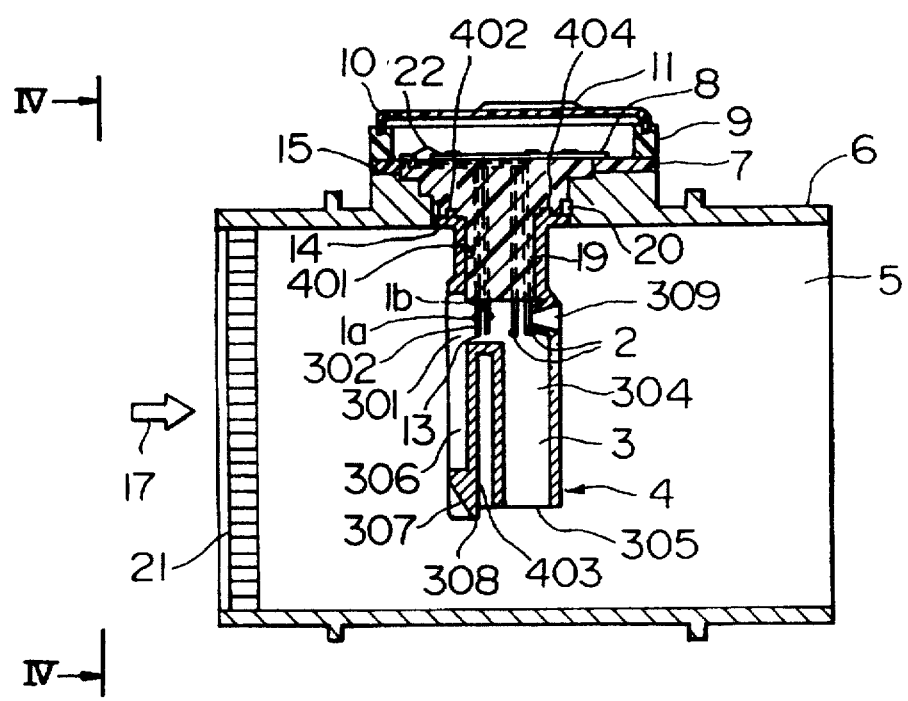
FIG. 3 is a vertical cross-sectional view of another embodiment of a thermal-type air flow measuring instrument of the invention.
Figure 4:
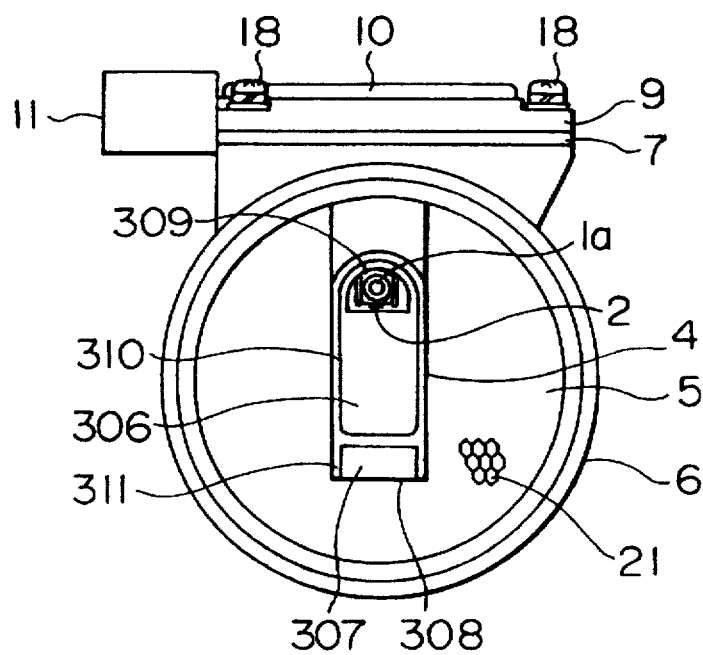
FIG. 4 is a side-elevational view as seen along the line IV—IV of FIG. 3.
Figure 9:
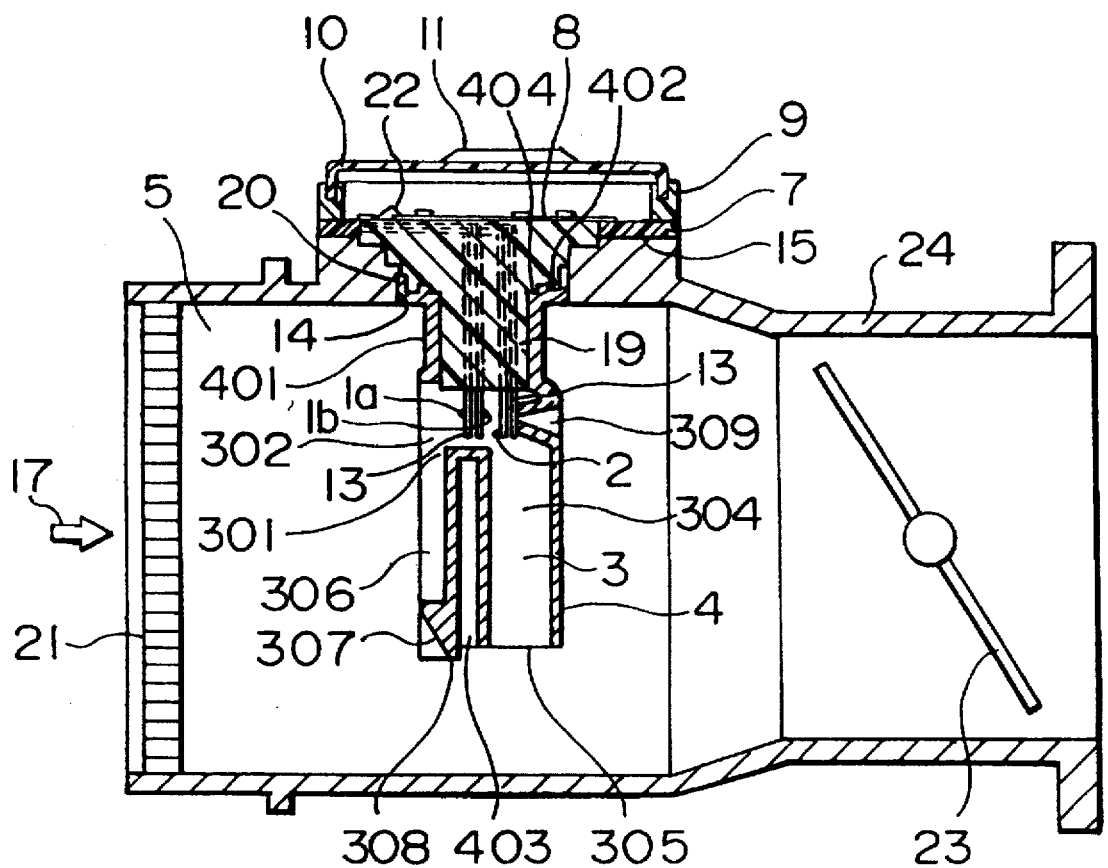
FIG. 9 is a longitudinal cross-sectional view of a thermal-type air flow measuring instrument of the invention incorporated in a throttle body.

FIG. 9 shows a thermal-type air flow measuring instrument in which a module, formed by integrally combining the circuit portion and the auxiliary passage member, shown in FIG. 3, together, is inserted into a throttle body 24 having a valve 23 for controlling the amount of intake air in an engine. A flow measuring portion is disposed upstream of the valve 23, and the direction of the forward flow is indicated by an arrow 17. Thermal-type air flow measuring instruments with an auxiliary air passage, in which component parts are integrally incorporated in a throttle body, have already been produced and marketed. However, in such measuring instruments, an auxiliary air passage member is formed integrally with the throttle body, or a housing member covering a circuit of a module is formed integrally with the throttle body, and then the throttle body is considerably complicated in construction. On the other hand, in the embodiment of the invention shown in FIG. 9, the circuit portion and the auxiliary passage member are combined together into a module, and therefore the construction of the throttle body can be simplified. In an intake system without any throttle valve (as in a diesel engine vehicle), the module can be mounted directly on an intake manifold.

Figure 10:
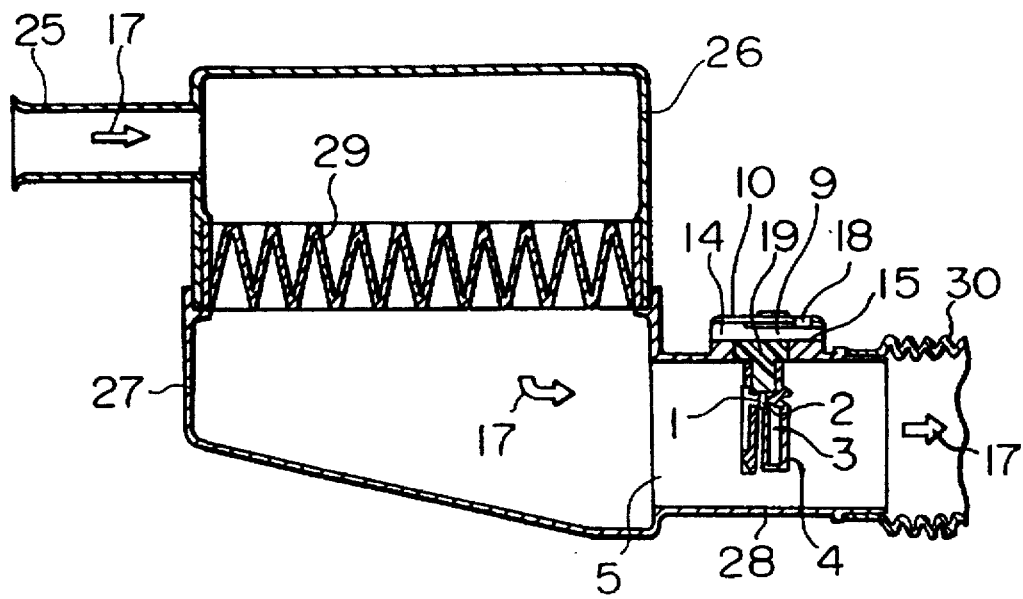
FIG. 10 is a longitudinal cross-sectional view of a thermal-type air flow measuring instrument of the invention incorporated in an air cleaner.

FIG. 10 shows a further preferred embodiment of the invention in which a module, formed by integrally combining the circuit portion and the auxiliary passage member shown in FIG. 3 together is mounted on a portion of an air cleaner to be installed in an engine room. The air cleaner comprises an upstream-side casing member 26 having an introducing duct 25 through which a fresh air is introduced, a downstream-side casing member 27 having a duct 28 for interconnecting the air cleaner and an intake duct 30, and a filter member 29 held between the two casing members 26 and 27 for removing dust from the air. A direction of forward flow of the air is indicated by an arrow 17, and clean air, from which dust is removed by the filter member 29, flows through the duct 28. An insertion hole 14 through which the auxiliary passage member of a thermal-type air flow measuring instrument is inserted is formed in a peripheral wall of the duct 28, and the module is mechanically fastened to the duct 28 by screws or the like. With this arrangement, a main passage can be provided using part of the air cleaner instead of the above-mentioned body having the main passage, and therefore there can be provided the inexpensive thermal-type air flow measuring instrument only requiring the module.

Figure 11:
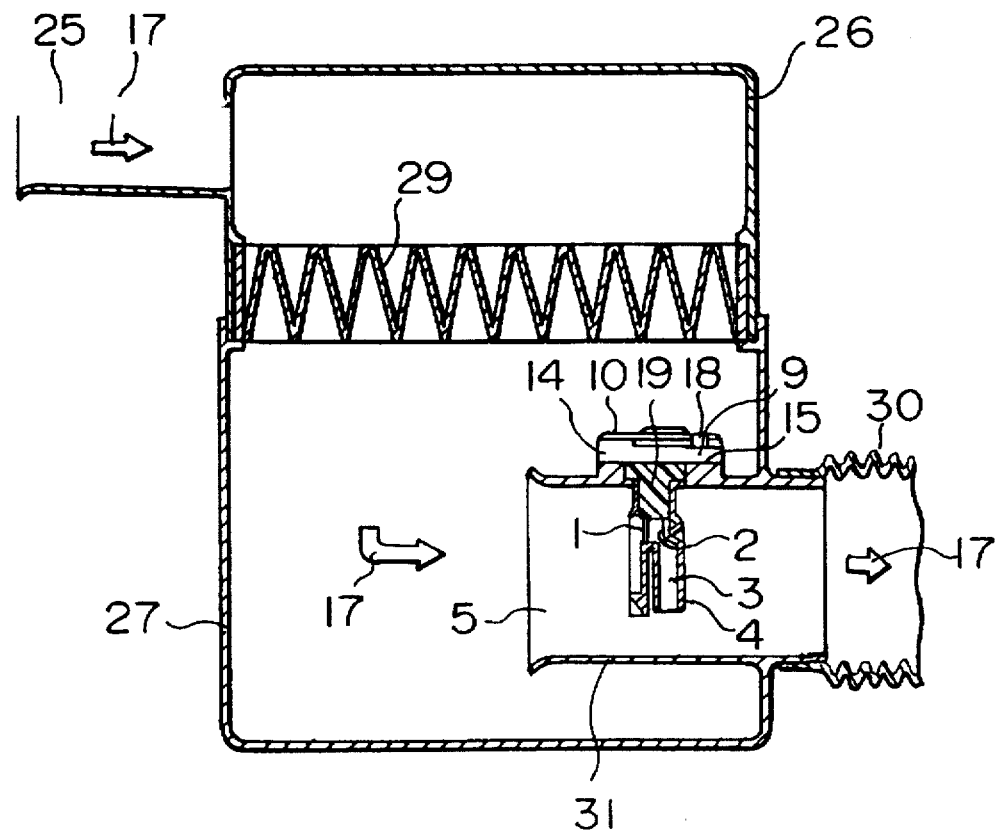
FIG. 11 is a longitudinal cross-sectional view of an air cleaner housing a thermal-type air flow measuring instrument of the invention.

FIG. 11 shows a further embodiment of the invention in which a module formed by integrally combining the circuit portion and the auxiliary passage member shown in FIG. 3 together is mounted on a portion of an air cleaner. Thus, this embodiment is basically similar to the embodiment of FIG. 10. In the embodiment of FIG. 10, the thermal-type air flow measuring instrument is mounted on part of the duct 28 mounted on the outside of the downstream-side casing member 27. However, in this embodiment of FIG. 11, a duct 31 is provided inside of a downstream-side casing member 27. An insertion hole 14 is formed through a peripheral wall of the duct 31, and the module is mounted in this insertion hole 14. An inlet end of the duct 31 is formed into a bell mouth-like configuration so as to rectifying the air flow. Thus, in this embodiment, the module of the thermal-type air flow measuring instrument is mounted within the air cleaner, and therefore the size of this structure can be reduced by an amount corresponding to the length of the duct 28 shown in FIG. 10, so that the intake system can be of a compact design. Although each of the duct 28 (FIG. 10) and the duct 31 (FIG. 11) is formed integrally with the downstream-side casing member 27 of the air cleaner, the duct 28, 31 may be separate from the casing member 27, in which case the duct is fixedly secured to the casing member 27 with a sufficient mechanical strength.

Figure 12:
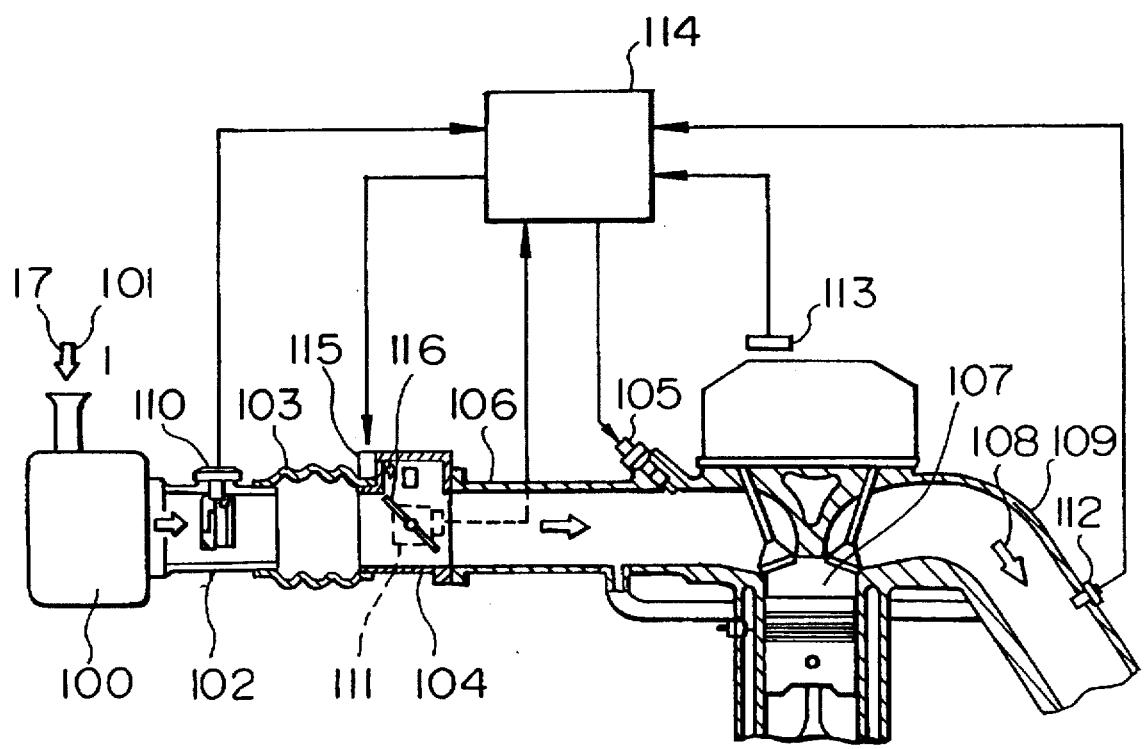
FIG. 12 is a view showing an internal combustion engine control system including a thermal-type air flow measuring instrument of the invention.

Finally, a control system for an internal combustion engine of the electronic fuel injection-type to which the present invention is applied will be described with reference to FIG. 12.

Intake air 101 from an air cleaner 100 flows through a body 102 (which constitutes a main passage of a thermal-type air flow measuring instrument), an intake duct 103, a throttle body 104 and a manifold 106 having an injector 105 to which fuel is supplied, and then is drawn into an engine cylinder 107. Gas 108, produced in the engine cylinder, is discharged through an exhaust manifold 109.

In response to an air flow rate signal from a module 110 of the thermal-type air flow measuring instrument, a throttle valve opening degree signal from an angle sensor 111, an oxygen concentration signal from an oxygen concentration sensor 112 mounted on the exhaust manifold 109, and an engine speed signal from an engine speed meter 113, a control unit 114 computes these signals to determine the optimum fuel injection amount and the degree of opening of an idle air control valve, and then control the injector 105 and an idle air control valve 115 in accordance with thus determined values.

Figure 13:
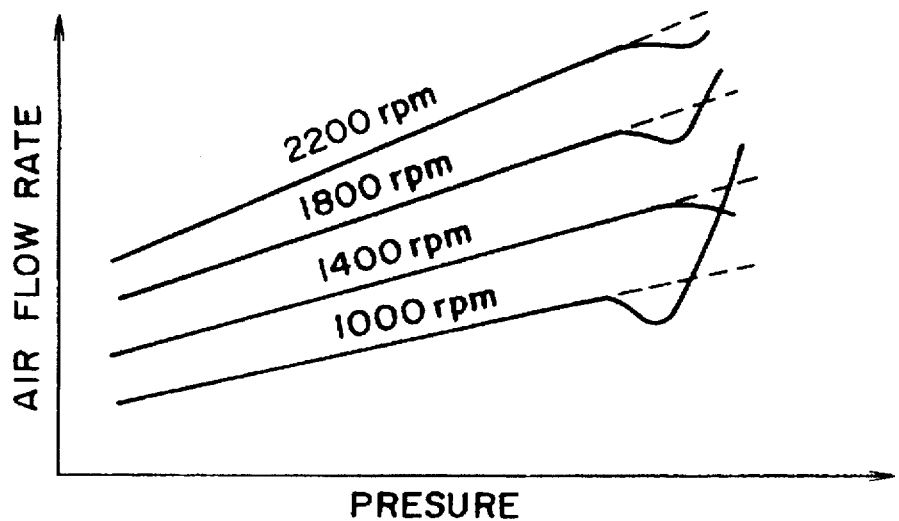
FIG. 13 is a diagram showing results of measurement of the flow rate of intake air in an internal combustion engine using a conventional thermal-type air flow measuring instrument.
Figure 14:
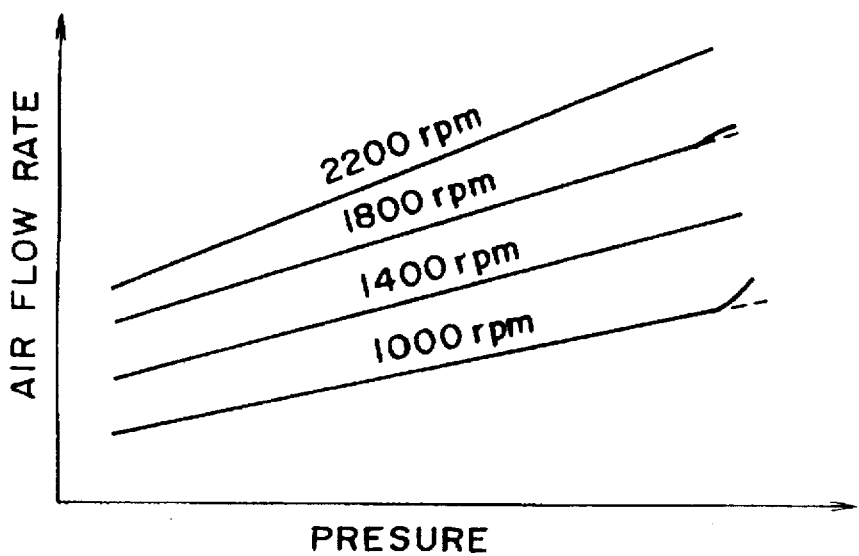
FIG. 14 is a diagram showing results of measurement of the flow rate of intake air in an internal combustion engine using a thermal-type air flow measuring instrument of the invention.

Here, if the intake air is flowing from the air cleaner 100 toward the engine cylinder 107 as described above, it is not necessary to provide a thermal-type air flow measuring instrument having the function of detecting a reverse flow as in the air flow measuring instrument of the present invention. However, when the degree of opening of a throttle valve 116 increases, the intake air forms a pulsating flow since the air, drawn into the engine cylinder, is not constant with time but is discontinuous, and particularly a pulsating period of the intake air, that is, the amplitude of the pulsating flow, produced when the engine speed resonates with the natural frequency of the intake system, is very large, and involves a reverse flow. Namely, there is produced the flow which causes a reverse flow only at the specific engine speed, and therefore in order to accurately measure the rate of flow of the air drawn into the engine cylinder 107 under all engine-operating conditions, there is provided the thermal-type air flow measuring instrument of the invention which detects the forward flow rate and the reverse flow rate, and accurately measures not only the steady flow but also the pulsating flow involving the reverse flow. Advantageous effects of the present invention will be described in connection with the measurement of the flow rate of the intake air in the above internal combustion engine. FIG. 13 is a graph showing results of measurement of the engine speed (parameter), in which the ordinate axis represents the air flow rate measured by a conventional thermal-type air flow measuring instrument not detecting the reverse flow rate, and the abscissa axis represents the pressure downstream of the throttle valve. FIG. 14 is a graph showing results of similar measurement effected by the use of the thermal-type air flow measuring instrument of the present invention. The rate of flow of the air into the engine cylinder should be linear, actually. However, in the conventional technique, an error (a difference between a solid line and a dot line), e.g. a minus error due to the pulsating flow, as well as a large plus error due to a reverse flow, is encountered as will be appreciated from FIG. 13. On the other hand, in the present invention, a minus error hardly develops, and a plus error can be reduced to about 1/10 of that encountered with the conventional technique.

What is claimed is:

1. A thermal-type air flow measuring instrument comprising:

two temperature sensing resistors mounted respectively at an upstream side and a downstream side within a fluid passage in close proximity to each other;

means for judging, from a difference in heat radiation amount between said upstream-side and downstream-side temperature sensing resistors, whether a direction of a fluid is forward or reverse, and for outputting a signal corresponding to a rate of flow of the fluid; and an auxiliary passage provided in said fluid passage, said auxiliary passage comprising a first passageway in which said two temperature sensing resistors are disposed, a second passageway through which most of the fluid flowed into said first passageway in a forward direction flows, and a third passageway to direct a reverse flow of the fluid toward said temperature sensing resistors.

2. An instrument according to claim 1, in which said auxiliary passage is provided within an intake air passage of an internal combustion engine.

3. An instrument according to claim 2, in which said first passageway is generally parallel to a direction of a main flow of the fluid in said fluid passage, said second passageway is bent generally at a right-angle at a position downstream of said temperature sensing resistors, and extends in a direction generally perpendicular to the direction of the main flow, said first and second passageways cooperating with each other to form a generally L-shaped passage, and said third passageway is provided immediately downstream of said temperature sensing resistors, and extends generally parallel to said first passageway, said third passageway being smaller in transverse cross-sectional area than said second passageway.

4. An instrument according to claim 2, in which said third passageway is flaring in the direction of the forward flow.

5. An instrument according to claim 2, in which said third passageway projects from an inner surface of said auxiliary passage toward said temperature sensing resistors.

6. An instrument according to claim 1, in which said first passageway is generally parallel to a direction of a main flow of the fluid in said fluid passage, said second passageway is bent generally at a right-angle at a position downstream of said temperature sensing resistors, and extends in a direction generally perpendicular to the direction of the main flow, said first and second passageways cooperating with each other to form a generally L-shaped passage, and said third passageway is provided immediately downstream of said temperature sensing resistors, and extends generally parallel to said first passageway, said third passageway being smaller in transverse cross-sectional area than said second passageway.

7. An instrument according to claim 1, in which said third passageway is flaring in the direction of the forward flow.

8. An instrument according to claim 1, in which said third passageway projects from an inner surface of said auxiliary passage toward said temperature sensing resistors.

9. An instrument according to claim 1, in which an inner diameter of a smallest-diameter portion of said third passageway is generally equal to a length of a sensing portion of each of said temperature sensing resistors.

10. An instrument according to claim 1, in which a peripheral wall surrounds an open end of said first passageway, through which the forward flow enters into said auxiliary passage, and an open end of said third passageway through which the reverse flow enters into said auxiliary passage.

11. An instrument according to claim 10, in which a bottom surface of said peripheral wall is inclined.

12. An instrument according to claim 1, in which an open end of said second passageway which serves as an outlet of said auxiliary passage for the forward flow is disposed in a plane substantially parallel to the direction of the main flow in said fluid passage.

13. An instrument according to claim 12, in which a projection for deflecting the fluid flow is formed at one or each of an upstream side and a downstream side of said open end of said second passageway.

14. An instrument according to claim 1, in which said auxiliary passage is formed integrally with said fluid passage.

15. An instrument according to claim 14, in which a member constituting said auxiliary passage is molded of a plastics material.

16. An instrument according to claim 1, in which a member constituting said auxiliary passage is formed integrally with a circuit module which incorporates an electronic circuit electrically connected to said temperature sensing resistors so as to control said resistors and also to convert an output.

17. An instrument according to claim 16, in which said member constituting said auxiliary passage is molded of a plastics material.

18. An instrument according to claim 17, in which said auxiliary passage-constituting member and said circuit module, which are integrally joined together, are detachably mounted on a member defining said fluid passage.

19. An instrument according to claim 18, in which said fluid passage-defining member is one of an air cleaner, a throttle body and an intake manifold of an intake system of an internal combustion engine.

20. A control system which controls an internal combustion engine using said thermal-type air flow measuring instrument as defined in claim 1.

21. An instrument according to claim 1, in which said third passageway is located downstream of said sensing resistors.

22. An instrument according to claim 21, in which said third passageway converges in an upstream direction.

23. An instrument according to claim 22, wherein said third passageway is arranged in proximity to said temperature sensing resistors so as to direct the reverse flow toward said temperature sensing resistors.

* * * * *